United States Patent
Van Horssen et al.

(10) Patent No.: US 9,509,865 B2
(45) Date of Patent: Nov. 29, 2016

(54) DEVICE AND METHOD FOR PROCESSING A REPROGRAPHIC JOB

(71) Applicant: OCÉ-TECHNOLOGIES B.V., Venlo (NL)

(72) Inventors: Ernst P. Van Horssen, Eindhoven (NL); Jan H. Geels, 's-hertogenbosch (NL); Abraham Thijssen, Vierlingsbeek (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/976,232

(22) Filed: Dec. 21, 2015

(65) Prior Publication Data

US 2016/0105571 A1  Apr. 14, 2016

Related U.S. Application Data

(63) Continuation of application No. PCT/EP2014/063518, filed on Jun. 26, 2014.

(30) Foreign Application Priority Data

Jul. 3, 2013  (EP) ..................................... 13174856

(51) Int. Cl.
*G06F 15/00* (2006.01)
*H04N 1/00* (2006.01)
*G06F 3/12* (2006.01)

(52) U.S. Cl.
CPC ........ *H04N 1/00244* (2013.01); *G06F 3/1204* (2013.01); *G06F 3/1208* (2013.01); *G06F 3/1264* (2013.01); *G06F 3/1265* (2013.01); *G06F 3/1285* (2013.01); *H04N 1/0032* (2013.01); *H04N 2201/0094* (2013.01)

(58) Field of Classification Search
CPC .............................................. H04N 2201/0094
USPC ......................................................... 358/1.15
See application file for complete search history.

(56) References Cited

U.S. PATENT DOCUMENTS

| | | | |
|---|---|---|---|
| 2002/0080400 A1* | 6/2002 | Hube | G06F 3/1205 358/1.15 |
| 2007/0165258 A1* | 7/2007 | Farrell | G06F 3/1205 358/1.13 |
| 2007/0300168 A1* | 12/2007 | Bosma | G06F 3/1205 715/820 |
| 2008/0256541 A1 | 10/2008 | Rai | |
| 2012/0188580 A1 | 7/2012 | Gaertner et al. | |
| 2012/0200865 A1 | 8/2012 | Sakurai | |

* cited by examiner

*Primary Examiner* — Saeid Ebrahimi Dehkord
(74) *Attorney, Agent, or Firm* — Birch, Stewart, Kolasch & Birch, LLP

(57) ABSTRACT

Device for receiving a reprographic job comprising a first processing step on a media by a first processing apparatus and a second, subsequent processing step on the media by a second processing apparatus, wherein the media that are to be output by the first processing apparatus are to be subjected to media handling operations between the first processing step and the second processing step comprising unloading from the first processing apparatus, intermediate media handling operations, and loading in the second processing apparatus; the device comprising: a controller arranged for creating or receiving the reprographic job; the controller being further arranged to access a storage storing configuration information on the second processing apparatus, the configuration information relating to loading media in the second processing apparatus; wherein the controller is arranged to specify the first processing step in the first specification in the reprographic job in order to simplify the media handling operations.

19 Claims, 4 Drawing Sheets

DEVICE AND METHOD FOR PROCESSING A REPROGRAPHIC JOB

CROSS REFERENCE TO RELATED APPLICATIONS

This application is a Continuation of PCT International Application No. PCT/EP2014/063518, filed on Jun. 26, 2014, which claims priority under 35 U.S.C. 119(a) to patent application Ser. No. 13/174,856.8, filed in Europe on Jul. 3, 2013, all of which are hereby expressly incorporated by reference into the present application.

FIELD OF THE INVENTION

The present invention relates to a device for creating or receiving a reprographic job, the reprographic job comprising a first specification of a first processing step on a media by a first processing apparatus and a second specification of a second processing step on the media by a second processing apparatus, wherein the media that are to be output by the first processing apparatus are to be subjected to media handling operations between the first processing step and the second processing step comprising unloading from the first processing apparatus, optional intermediate media handling operations, and loading in the second processing apparatus.

The present invention further relates to a method for processing a reprographic job, the reprographic job comprising a first specification of a first processing step on a media by a first processing apparatus and a second specification of a second processing step on the media by a second processing apparatus, wherein the media that are to be output by the first processing apparatus are to be subjected to media handling operations between the first processing step and the second processing step comprising unloading from the first processing apparatus, optional intermediate media handling operations, and loading in the second processing apparatus.

The present invention also relates to a computer program product that when executed on a processor executes such a method.

The present invention further relates to a data carrier comprising such a computer program product.

BACKGROUND OF THE INVENTION

In the graphical industry the product goes through a number of processing steps such as designing, proofing, printing, and finishing before the final product is obtained. During the printing process the product moves from a digital form to a tangible form by creating an image according to a digital file upon a suitable media such as paper, or film. After printing the product may move through several finishing steps, such as folding, cutting, trimming, stapling, binding, and packaging. Some of these processing steps are performed inline requiring no intermediate handling of the media by an operator. However, more often the finishers are stand-alone apparatuses. This requires the operator to take the media out of one apparatus, move the media to a further apparatus and load the media in this further apparatus. Instructions on what processing steps are required and specific details on these processing steps are mostly carried on an order form by the operator when moving the media through the different processing steps.

However, this still leaves room for errors. If the operator is not familiar enough with specific pieces of equipment or when the job is not the regular job, but more or less an out-of-the-ordinary kind of job, the operator might operate the equipment incorrectly (or select the wrong kind of equipment altogether) and waste material and time. For example, binding a stack of sheets on the wrong edge would most probably not result in a final product that is acceptable to the customer.

It is therefore an object of the present invention to improve the reliability of the processing.

SUMMARY OF THE INVENTION

The object of the present invention is met by a device for creating or receiving a reprographic job, the reprographic job comprising a first specification of a first processing step on a media by a first processing apparatus and a second specification of a second processing step on the media by a second processing apparatus, wherein the media that are to be output by the first processing apparatus are to be subjected to media handling operations between the first processing step and the second processing step comprising unloading from the first processing apparatus, optional intermediate media handling operations, and loading in the second processing apparatus; the device comprising: a controller arranged for creating or receiving the reprographic job; the controller being further arranged to access a storage storing configuration information on the second processing apparatus, the configuration information relating to loading media in the second processing apparatus; wherein the controller is arranged to specify the first processing step in the first specification in the reprographic job in order to simplify the media handling operations, by performing at least one of: determining a print order of documents in the reprographic job, determining a print order of pages in a document in the reprographic job, determining a print orientation of a page in a document in the reprographic job, and determining a print side on a media sheet of a page in a document in the reprographic job; wherein during determining the stored configuration information with regard to loading the second processing apparatus is taken into account.

The device may strictly be any apparatus in the processing chain, or may be an external apparatus communicating with any of the apparatuses in the processing chain.

However, the invention is most effective when the device is (directly or indirectly) early in the processing chain. In preferred embodiments the device is a printer device, a multifunctional device comprising a printer function, or a print server. However, the device might even be a computer involved in the prepress stage.

The device may either create a job, or may modify a job created by an upstream apparatus. The job comprises details on a first processing step and details on a second processing step. The second processing step may directly follow the first processing step. However, there may be an intermediate processing step between the first and second processing step. The second processing step requires the operator to load the media that have been output by the first processing step in the second processing apparatus. This loading must be done correctly, which might require additional, manual handling operations by the operator, for example, a stack of media may need to be turned over or even worse individual sheets may need to be turned over, the media may need to be rotated to orient them correctly (portrait to landscape or vice versa), stacks of sheets may need to be merged or split, etc.

The device determines the second processing apparatus suitable to execute the second processing step. If the reprographic job was received by the device, this information may be obtained from the information received in the job. If the device itself is creating the job, this determination may be based on information obtained from other sources, for example, directly from user input received from a user operating the device and creating the job.

Next, configuration information on the second processing apparatus is obtained from a storage. The storage for storing the configuration information may be a storage internal to the device, or may be an external storage that is for example accessed through a computer network. The configuration information comprises details on the processing by the second processing apparatus. For example, the configuration information of a binder may comprise what edges may be bound, the configuration information of a trimmer may comprise what edges may be trimmed, but also the range of the trimming knives. Thus, the configuration information may also comprise constraints of the apparatus as well as options of the apparatus. This allows the device to determine how the media should be loaded in the second processing apparatus.

Once it has been determined how the media are to be loaded in the second processing apparatus, the device determines how the processing upstream is to be done in order to remove as many media handling operations to be performed by the operator when loading the media into the second processing apparatus. For example, when two documents need to be printed on pre-cut sheet of the same format, and then bound together, the printer should print both documents to the same output tray on a single stack in order to prevent the operator from needing to merge two separate stacks. However, when two documents need to be printed on pre-cut sheets of a different format, and the larger sheets first need to be folded to the same size as the smaller sheets before all sheets are bound together, the printer should print the two documents to two separate stacks. This allows the operator to take the stack of the larger sheets without having to split one big stack, put the complete stack with the larger sheets in a folding apparatus, and then merge the stack of folded sheets with the stack of smaller sheets and loading the merged stack in the binder apparatus.

Similarly, flipping over a stack may be prevented by adjusting the page order during the print process. By adjusting in the first processing step the order of the documents, or adjusting the order of pages in a document, or adjusting the orientation of pages, or adjusting the side of the media to be printed, or combinations thereof and controlling when to create new stacks or not, media handling operations by the operator are prevented or simplified, reducing the amount of work to be done by the operator and reducing the chance of the operator doing things incorrectly and wasting material and time.

In order to achieve this a document order and/or a page order within a document, and/or a page orientation, and/or a media side to be printed are specified in the first processing step in the reprographic job such that media handling operations by the operator before loading the media in the second processing apparatus are limited or entirely removed. The media may be precut sheets, sheet from a roll (or web), and signature sheets to be folded into folio, quarto, octavo, sextodecimo, etc. and trimmed.

According to a preferred embodiment, the present invention provides a device, wherein the media are output by the first processing apparatus to a media output; wherein the controller is arranged to output operator information on media that is output to the media output: when the media output is still empty and before a job is output to the media output; and/or when the device has completed outputting a job to the media output; wherein the operator information comprises information instructing the operator on loading the output media in the second processing apparatus for further processing of the media.

The media output may for example be an output bin or output tray, a trolley for receiving and carrying a stack of sheets, or a spindle in case of roll-to-roll processing.

According to this embodiment before and/or after the job is being output, an operator instruction is output on media. This may be a separate sheet, for example, in case of pre-cut sheets, or a sheet where the job itself is printed on, for example in the case of processing roll-to-roll. In the case of signature sheets, operator sheets may be output on a separate sheet or on the same sheet as the job itself is printed, for example outside the bleed area such that the operator instructions are ultimately trimmed off. The operator instructions may be any instruction informing the operator on what needs to be done with the media before or during loading in the second processing apparatus.

According to a particular embodiment, the present invention provides a device, wherein the operator information comprises an instruction with regard to the required orientation of the media in the second processing apparatus in order to ensure proper post-processing by the second processing apparatus. The media orientation may refer to the orientation in any of the three spatial dimensions.

According to a further embodiment, a device is provided, wherein the instruction comprises text informing the operator on the side of the media that is required to be up, such as "This side up", "This side down", "Other side up", or "Flip stack". Additionally, or alternatively, the instruction may comprise pictorial instructions.

According to another embodiment, a device is provided, wherein the instruction comprises a registration mark for indicating the proper registration when loading the media in the second processing apparatus. The operator should register the registration mark with a counter registration mark on the second processing apparatus.

Alternatively, he should align the media such that the edge or edges of the media where the registration mark resides abuts a registration stop or stops.

In a specific embodiment, a device is provided, wherein the device comprises the first processing apparatus. This is advantageous as the device itself is aware of its capabilities (and limitations) to adjust the order of the documents in the job, adjust the order of the pages in a document in the job, adjust the orientation of a page in a document, and/or adjust the side of the media a page is output on. Otherwise the device might depend on a storage containing configuration information with regard to the first processing apparatus similar as is the case with the second processing apparatus. For some types of first processing apparatuses though, it is safe to assume for specific operations that the apparatus is capable of performing them. For example, printers are generally capable of reversing the page order. However, simplex printers will not be able to change the printed side of the media, and punchers will not be able to change the page order.

According to one aspect of the present invention a method is provided for processing a reprographic job, the reprographic job comprising a first specification of a first processing step on a media by a first processing apparatus and a second specification of a second processing step on the media by a second processing apparatus, wherein the media that are to be output by the first processing apparatus are to be subjected to media handling operations between the first processing step and the second processing step comprising unloading from the first processing apparatus, optional intermediate media handling operations, and loading in the second processing apparatus; the method comprising: receiving or creating the reprographic job; retrieving from the second specification in the reprographic job an apparatus type of the second processing apparatus; retrieving from a storage storing configuration information on the second processing apparatus type, configuration information relating to loading media in the second processing apparatus; performing at least one of the following steps: a) determining a print order of documents in the reprographic job, b) determining a print order of pages in a document in the reprographic job, c) determining a print orientation of a page in a document in the reprographic job, and d) determining a print side on a media sheet of a page in a document in the reprographic job; wherein during determining the stored configuration information with regard to loading the second processing apparatus is taken into account; and in order to simplify the media handling operations, specifying: a) the determined print order of documents in the reprographic job, b) the determined print order of pages in a document in the reprographic job, c) the determined print orientation of a page in a document in the reprographic job, and/or d) the determined print side on a media sheet of a page in a document in the reprographic job, in the first processing step in the first specification in the reprographic job.

According to a preferred aspect of the invention, a method is provided, wherein the first processing apparatus is a printer or a multifunctional device comprising a printer function; wherein the method further comprises the steps of: the first processing apparatus outputting operator information on media that is output to a media output; wherein outputting the operator information on the media is performed: when the media output is still empty and before the job is output to the media output; and/or when the device has completed outputting the job to the media output; wherein the operator information comprises information instructing the operator on loading the output media in the second processing apparatus for further processing of the media.

According to a further aspect of the invention, a method is provided, wherein outputting the operator information comprises outputting an instruction with regard to the required orientation of the media in the second processing apparatus in order to ensure proper post-processing by the second processing apparatus.

According to again a further aspect, the invention provides a method, wherein outputting the instruction comprises outputting text informing the operator on the side of the media that is required to be up, such as "This side up", "This side down", "Other side up", or "Flip stack".

According to another aspect of the invention a method is provided, wherein outputting the instruction comprises outputting a registration mark for indicating the proper registration when loading the media in the second processing apparatus.

In another embodiment the invention provides a computer program product that when executed on a processor executes such a method.

In a further embodiment the invention provides a data carrier comprising such a computer program product.

BRIEF DESCRIPTION OF THE DRAWINGS

Further embodiments and advantages will be given below with reference to the drawings, in which.

DETAILED DESCRIPTION

Figure 1:
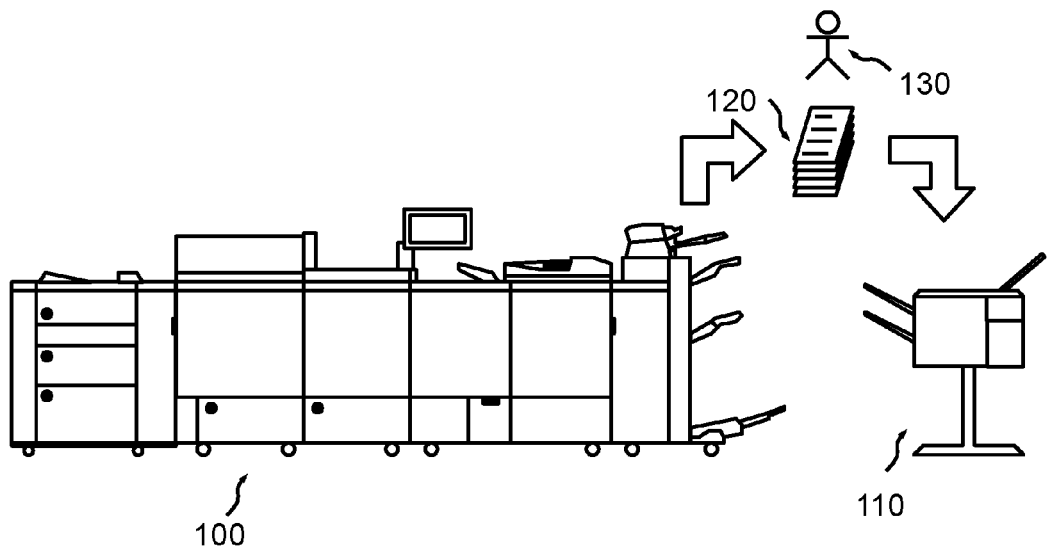
FIG. 1 is a diagrammatic representation of the context wherein the present invention may be practiced.
Figure 2:
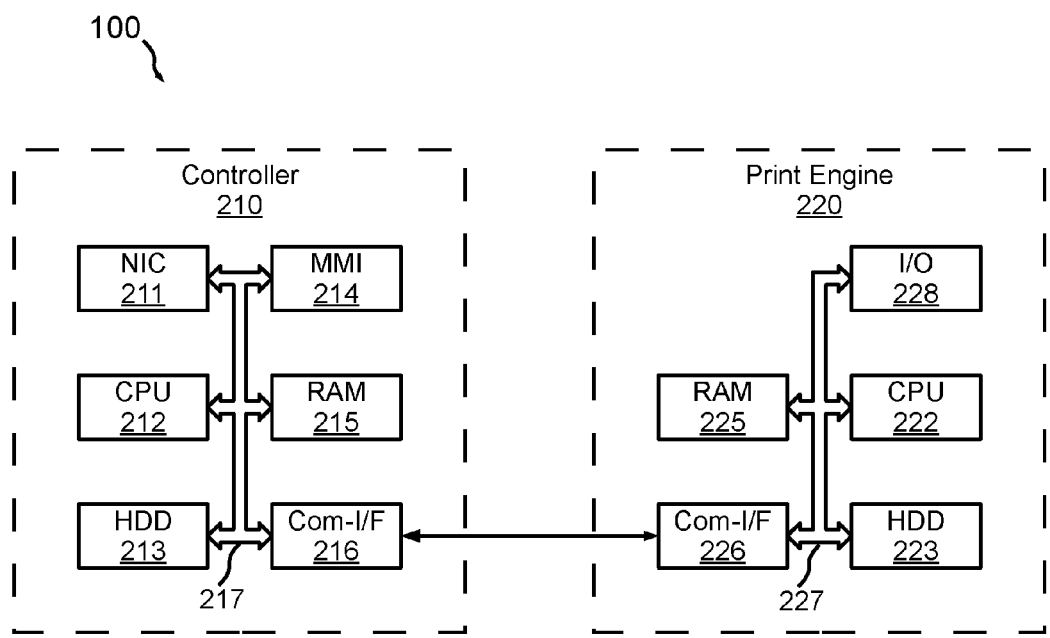
FIG. 2 is a diagrammatic representation of a reprographic apparatus implementing the present invention.

An advantageous embodiment of the present invention (FIG. 1) comprises a reprographic apparatus, such as a printer 100. Printer 100 comprises a controller 210 (FIG. 2) and a print engine 220. The controller 210 is responsible for receiving print jobs from a computer network through network interface card (NIC) 211. The print jobs comprise one or more documents to be printed that are stored in an internal non-volatile memory, such as a hard disk drive (HDD) 213. Components inside the controller 210 communicate with each other through a data bus 217. Print jobs further comprise a print ticket with metadata defining how the job should be processed, for example, whether the documents need to be printed simplex or duplex, what media to print the documents on, etcetera. A CPU 212 is responsible for managing the jobs received and for controlling the high-level operations of the printer 100. The data the processor operates upon is temporary stored in a volatile memory, such as RAM 215, for high speed access. For example, the CPU 212 loads the documents defined in a print job from the hard disk drive 213 into the memory 215. These documents are defined in a printer definition language (PDL) such as Postscript (PS) or Portable Document Format (PDF). The CPU 212 interprets the PDL in the document and creates in memory 215 a bitmap of the document. Due to the size of the bitmap, the bitmap is temporarily stored on the hard disk drive 213. Usually, the bitmaps produced are too large to fit entirely into the memory 215. When bitmaps have been created of the pages in the documents in a print job and the print engine 220 is ready to print the print job, the bitmaps together with printing commands are moved from the controller 210 to the print engine 220. For this purpose the controller 210 comprises a communication interface 216 that communicates with a corresponding communication interface 226 in the print engine 220. The print engine 220 is responsible for controlling all hardware components that are involved in the actual printing process, such as the electrophotographical drum, the motors driving the pinches, the fuser, etcetera. These components are controlled through input/output (I/O) block 228. The whole process is controlled by CPU 222 which uses a volatile memory 225 for temporary data storage. A hard disk drive 223 is provided in the controller for non-volatile data storage. These components are interconnected through a data bus 227.

A print order moves through a long chain of processing steps, starting in digital form where the product is designed and (digitally) created, going through a number of pre-processing steps such as pre-flighting and proofing. During the printing process, the printer 100 creates a tangle form of the product (for example a stack of printed paper sheets) based on the digital form. The tangle form is further processed through a number of post-processing steps, such as folding, trimming, and binding, to produce the final product. Several of these processing steps are being performed by dedicated apparatuses, such as cutters. Other processing steps may be performed on one and the same apparatus, for example, creating a document and pre-flighting it may be done on the same computer. Furthermore, apparatuses may be combined into a single system, for example, a printer may be combined with an inline folder and stacker. However, in a typical reprographic environment one finds multiple apparatuses with at least part of these apparatuses performing different functions. Depending on the print order the tangle product therefore needs to be moved from one apparatus to another.

The printer 100 outputs printed sheets that are output to an output stack 120 (FIG. 1) in an output tray. An operator 130 needs to take the output stack 120 out of the output tray and move it to the next apparatus 110 where the next processing step is performed, for example folding the sheets. In the folder 110, the stack 120 has to be loaded properly. This requires the operator 130 to make sure that:

the stack only contains sheets that need to undergo the specific next processing step, otherwise, the operator has to separate the stack into two or more stacks;

the stack only contains sheets that need to be processed exactly in the same way, for example folded in the same direction and at the same point, otherwise he has to reorient sheets, or split the stack even further;

make sure the resulting stack is correctly loaded into the machine, meaning the correct side on top, and the proper edges aligned with an alignment mark or placed against a registration ruler.

According to the present invention, a printing job that is created to (partly) execute a print order is created such, or modified such that the media handling operations that are to be performed by the operator when moving the stack from printer 100 to finisher 110 are either eliminated as much as possible or simplified as much as possible.

Take for example the situation that a cut sheet printer 100 by default prints the pages in a document from first page to last page. When the printer 100 starts outputting sheets to the output tray, the sheet with the first page is output first and ends up at the bottom of the stack. If it makes a difference for the finishing apparatus 110 what side is on top of the stack, the operator should pay attention whether he needs to load the stack with the first page on the bottom of the stack, or on top of the stack. In the latter case, he is required to turn the stack over in order to make the first page face up.

However, if printer 100 implements the present invention, the printer 100 receives the print job. The print job will contain two processing steps: first printing the document in the job, and second processing by finishing apparatus 110, say binding the printed document. It will analyse the job ticket and determines that after printing, the stack of printed sheets need to be processed by the finisher 110. The printer will then retrieve from a finisher database configuration information on finisher 110. The configuration information comprises information on how paper should be loaded into finisher 110. From the configuration information, the printer 100 will determine that finisher 110 requires the first page to be on the top of the stack and to face up. Therefore, the printer 100 will modify the print job and specify that the first processing step (printing the document) is to be done with reverse page order.

Figure 3:
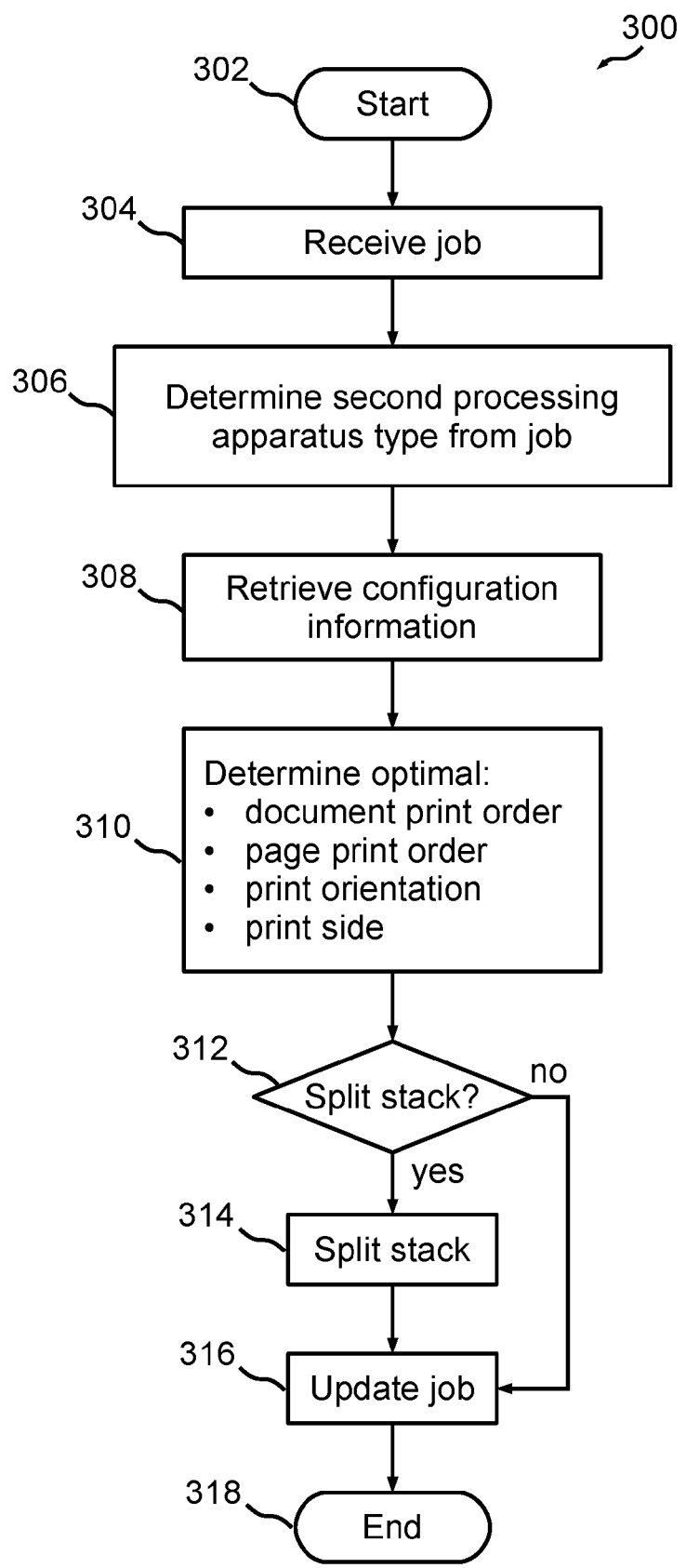
FIG. 3 is a flow diagram showing a method according to the present invention.

FIG. 3 shows a flow chart 300 of a method according to the invention. Processing starts 302 and receives 304 a print job. Next, the print job is interpreted. At least two processing steps are found: A second processing step directly or indirectly following a first processing step. "First" and "second" only relates to the relative order of the two processing steps discussed here. There might be further processing steps between the first and the second processing step.

It is determined 306 what type of processing apparatus is to perform the second processing step. A database is accessed in order to retrieve 308 configuration information with regard to the second processing apparatus. In the next step 310, it is analysed how the second processing apparatus is to be loaded. Based on this information, it is determined how the printing step may be altered in order to eliminate manual media handling operations by the operator when loading the second processing apparatus. It is further determined whether the whole stack needs to be processed by the second processing apparatus in the same way, to determine 312 whether output stack needs to be split. If the whole output stack needs to be processed in the same way by the second processing apparatus, there is no need to split the stack and the process continues at step 316. However, if different parts are to be processed differently (say part of the output stack needs to be folded and part does not), the stack is split 314 in at least one stack that requires processing by the second processing apparatus, and at least one stack that does not require processing by the second processing apparatus. This way, the operator does not need to manually split the stack and may simply pick up the complete stack that requires the second processing step and load it into the second processing apparatus.

Two different approaches may be followed here. The print job may comprise multiple parts that do not require the second processing step and multiple parts that do require the second processing step. In the first approach all parts that do require the second processing step are combined into a single stack that is processed by the second processing apparatus in one operation. In the second approach, the different parts are kept separate. Depending on the number of parts and the number of sheets in each part, the one or the other approach may be more efficient.

If it is determined that changing the document print order and/or the page print order and/or the print orientation and/or print side of one or more pages would require the operator 130 to perform less media handling operations or to perform simpler media handling operations, and the printer is capable of changing the document print order and/or page print order and/or print orientation and/or print side, the print job is modified 316; specifically the specification of the first processing step (the printing in this example). Also, if it is advantageous to split the stack, the print job is modified to make the printer produce multiple stacks, for example, by pausing printing in order to let an operator remove a stack, or alternatively, continue printing a second stack to another output tray.

Finally, the process ends at step 318.

In the present example it is the printer determining how the print job is to modified, and it is the processing by the printer that is being modified. Determining how to modify the print job may also be done by other apparatuses, for example a print server.

Furthermore, it is not just the processing of the printer that may be modified. For example, the digital documents may be modified at submission or prior to submission, for example by the printer driver or by an application program in the digital workflow such as a pre-flight application. More specifically, a page order or page orientation may be modified in the digital document before it is submitted or during submission.

Basically, configuring the print job may be done anywhere upstream of the manual operations by the operator 130. As digital objects are easier to manipulate than tangible objects, this can be most effectively done before the tangle product is created (i.e. before the printing process). It should be noted that it is still possible to do (some of) these configurations in a finishing step that precedes the manual media handling operations by the operator 130. For example, in a sequence of inline finishing steps, sheets might be flipped over or not, and with intermediate stackers one can restack or reorder stacks, which operations may be defined in the print job according to the invention. However, often this requires additional mechanical operations and possibly additional apparatuses. It is in general more effective to perform the optimisations at the printer or a print server.

Figure 4:
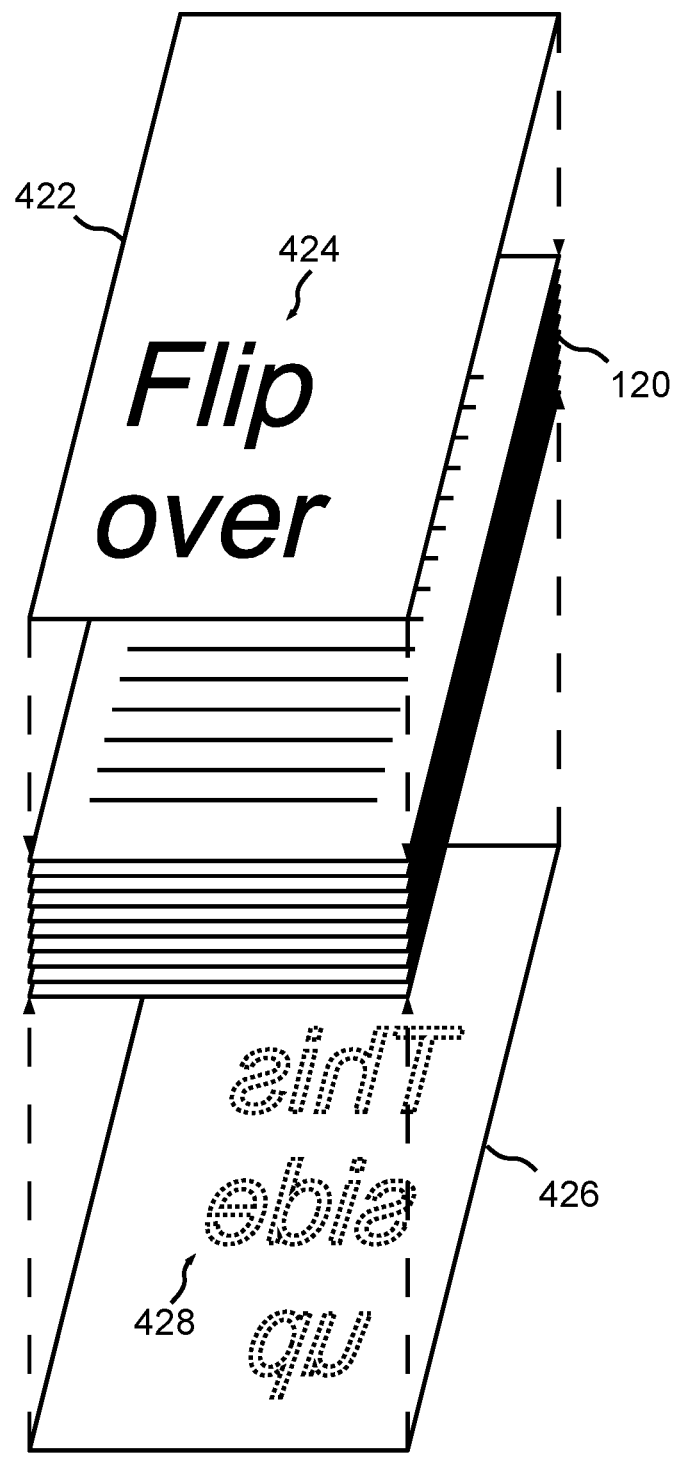
FIG. 4 is a stack of printed sheets according to the present invention.

Depending on the processing steps and the processing apparatuses available, it is not always possible to remove all manual media handling operations. Often the operator 130 still has to insert the media correctly in the second processing apparatus, for example a finisher. Although the present invention may have removed the need for flipping over a stack and orienting it correctly while loading, it is still advantageous to guide the operator 130 during the loading process. This may be done by including operator instructions with the media. For example, pre-printed instructions may be placed on top of a stack. Alternatively, operator instruction may be printed on media. FIG. 4 shows an example of operator instructions being printed on the media by a cut sheet printer or a printer with an inline cutter and stacker. Before the media are output, an initial operator instruction 428 is printed on an additional sheet 426 that ends up at the bottom of the stack. The initial operator instruction 428 is printed on the side of the sheet that will be facing down. Subsequently, the job itself is printed on sheets that form a stack 120. Now, the initial operator instruction 428 is facing away from the stack 120. This makes the instruction visible when the whole stack (including operator instructions) is flipped over. Furthermore, a final operator instruction 424 is printed after the print job has been printed. This instruction 424 is printed again on a separate sheet 422 that ends up at the top of the stack. The instruction 424 is printed on the side of the sheet that is facing up. This way the instruction is immediately visible. Whether the stack is either flipped over during handling or not, there is always an instruction facing up and immediately visible to the operator.

In the example shown, the final operator instruction 424 instructs the operator 130 to flip the stack over. When the operator 130 follows the initial instruction 424 and flips the stack over, he will see the initial operator instruction 428. The initial instruction 428 will confirm that the correct side of the stack is facing up for the following processing step. It is noted that the words "initial" and "final" do not refer to the moment the instruction is supposed to be seen/read by the operator. They refer to the moment they are inserted or printed relative to the print job itself.

The initial and final instructions may contain instructions on the removal of the instructions themselves, for example just prior to binding or to packaging the media. In a further embodiment multiple sheets containing initial or final operator instructions are output. Every sheet in a set of initial operator instructions or a set of final operator instructions relates to a separate processing step. By removing a sheet for each processing step, new instructions become visible for the next processing step. For example, a print job may be altered to print two final operator instructions 424 that end up on the top of a stack of sheets 120. The operator instruction printed first relates to a final binding step. The operator instruction printed second relates to a punching step. This punching operator instruction ends up on top of the binding operator instruction and is therefore seen first by the operator 130. The binding operator instruction may comprise a registration mark telling the operator 130 how to properly register the stack of sheets in the puncher apparatus. The punching operator instruction further comprises an instruction to remove the sheet after the punching operation. Removing the sheet with the punching operator instruction reveals the binding operator instruction, that also comprises a registration mark. This time for registering the stack in the binding machine. The binding operator instruction will further comprise an instruction to remove the instruction sheet before starting the binding operation (otherwise the instruction will be bound with the rest of the stack).

Figure 5:
FIG. 5 is a spindle with rolled-up sheet printed according to the present invention.

FIG. 5 shows an example of operator instructions with a roll-to-roll printer. Jobs are printed from a roll of paper to a spindle 510. During printing the media are wound around the spindle 510 forming a roll 520. The initial instruction is printed before the print job itself is printed. This initial instruction will end up at the inner part of the roll 520 and is therefore not visible until the roll is being unrolled again. Although initially invisible, the initial instruction is still useful. For example, if the printed roll is fed into an external cutter and stacker, the initial instruction will end up on the top of the stack after stacking, where it is immediately visible to the operator again serving further by instructing the operator on further handling. This also applies with roll-to-roll finishers. The final operator instruction will be inserted first in the finisher and end up on the inner part of the output roll (if not cut from the roll when the roll was inserted in the finisher). However, the initial operator instruction will become visible after this first finishing step allowing instructing the operator for a subsequent finishing step.

After the initial operator instruction is printed, the actual print job is printed to the roll 520. Finally, the final operator instruction is printed, such as a registration mark 522 that aids the operator in aligning the roll 520 correctly when the roll is loaded into a finisher. The roll 520 further comprises a textual operator instruction 524 to explain the meaning of the registration mark 522.

The embodiments described and shown herein are merely illustrative of the principles of the invention. Other embodiments and configurations may be devised without departing from the scope of the appended claims.

The invention claimed is:

1. A device for creating or receiving a reprographic job, the reprographic job comprising a first specification of a first processing step on a media performed by a first processing apparatus and a second specification of a second processing step on the media performed by a second processing apparatus, wherein the media that are to be output by the first processing apparatus are to be subjected to media handling operations performed by the operator between the first processing step and the second processing step comprising unloading from the first processing apparatus, optional intermediate media handling operations, and loading the media in the second processing apparatus, the device comprising:

a controller arranged for creating or receiving the reprographic job;

the controller being further arranged to access a storage storing configuration information on the second processing apparatus, the configuration information relating to loading media in the second processing apparatus;

wherein the controller is arranged to specify the first processing step in the first specification in the reprographic job in order to simplify the media handling operations, by performing at least one of:
- determining a print order of documents in the reprographic job,
- determining a print order of pages in a document in the reprographic job,
- determining a print orientation of a page in a document in the reprographic job, and
- determining a print side on a media sheet of a page in a document in the reprographic job;

wherein during the determining the stored configuration information with regard to the loading of the media in the second processing apparatus is taken into account.

2. The device according to claim 1, wherein the first processing apparatus is a printer or a multifunctional device comprising a printer function.

3. The device according to claim 2, wherein the media are output by the first processing apparatus to a media output;
- wherein the controller is arranged to output operator information on media that is output to the media output:
- when the media output is still empty and before a job is output to the media output; and/or
- when the device has completed outputting a job to the media output;
- wherein the operator information comprises information instructing the operator on loading the output media in the second processing apparatus for further processing of the media.

4. The device according to claim 3, wherein the operator information comprises an instruction with regard to the required orientation of the media in the second processing apparatus in order to ensure proper post-processing by the second processing apparatus.

5. The device according to claim 4, wherein the instruction comprises text informing the operator on the side of the media that is required to be up, such as "This side up", "This side down", "Other side up", or "Flip stack".

6. The device according to claim 4, wherein the instruction comprises a registration mark for indicating the proper registration when loading the media in the second processing apparatus.

7. The device according to claim 1, wherein the device comprises the first processing apparatus.

8. A method for processing a reprographic job, the reprographic job comprising a first specification of a first processing step on a media performed by a first processing apparatus and a second specification of a second processing step on the media performed by a second processing apparatus,
- wherein the media that are to be output by the first processing apparatus are to be subjected to media handling operations by the operator between the first processing step and the second processing step comprising unloading from the first processing apparatus, optional intermediate media handling operations, and loading the media in the second processing apparatus;
- the method comprising:
- receiving or creating the reprographic job;
- retrieving from the second specification in the reprographic job an apparatus type of the second processing apparatus;
- retrieving from a storage storing configuration information on the second processing apparatus type, configuration information relating to loading media in the second processing apparatus;
- performing at least one of the following steps:
  a) determining a print order of documents in the reprographic job,
  b) determining a print order of pages in a document in the reprographic job,
  c) determining a print orientation of a page in a document in the reprographic job, and
  d) determining a print side on a media sheet of a page in a document in the reprographic job;
- wherein during the determining the stored configuration information with regard to the loading of the media in the second processing apparatus is taken into account; and
- in order to simplify the media handling operations, specifying:
  a) the determined print order of documents in the reprographic job,
  b) the determined print order of pages in a document in the reprographic job,
  c) the determined print orientation of a page in a document in the reprographic job, and/or
  d) the determined print side on a media sheet of a page in a document in the reprographic job,
- in the first processing step in the first specification in the reprographic job.

9. The method according to claim 8, wherein the first processing apparatus is a printer or a multifunctional device comprising a printer function;
- wherein the method further comprises the steps of:
- the first processing apparatus outputting operator information on media that is output to a media output;
- wherein outputting the operator information on the media is performed:
- when the media output is still empty and before the job is output to the media output; and/or
- when the device has completed outputting the job to the media output;
- wherein the operator information comprises information instructing the operator on loading the output media in the second processing apparatus for further processing of the media.

10. The method according to claim 9, wherein outputting the operator information comprises outputting an instruction with regard to the required orientation of the media in the second processing apparatus in order to ensure proper post-processing by the second processing apparatus.

11. The method according to claim 9, wherein outputting the instruction comprises outputting text informing the operator on the side of the media that is required to be up, such as "This side up", "This side down", "Other side up", or "Flip stack".

12. The method according to claim 10, wherein outputting the instruction comprises outputting a registration mark for indicating the proper registration when loading the media in the second processing apparatus.

13. A non-transitory computer readable storage medium storing a computer program product that when executed on a processor executes the method according to claim 8.

14. The device according to claim 5, wherein the instruction comprises a registration mark for indicating the proper registration when loading the media in the second processing apparatus.

15. The device according to claim 2, wherein the device comprises the first processing apparatus.

16. The device according to claim 3, wherein the device comprises the first processing apparatus.

17. The device according to claim 4, wherein the device comprises the first processing apparatus.

18. The device according to claim 5, wherein the device comprises the first processing apparatus.

19. The device according to claim 6, wherein the device comprises the first processing apparatus.

\* \* \* \* \*